Dec. 4, 1956 R. C. MOORE 2,773,118

TELEVISION DEFLECTION CONTROL SYSTEM

Filed July 27, 1953 3 Sheets-Sheet 1

INVENTOR.
ROBERT C. MOORE

BY [signature]

ATTORNEY

INVENTOR.
ROBERT C. MOORE
BY
Allen V. Hazeltine
ATTORNEY

TELEVISION DEFLECTION CONTROL SYSTEM

Filed July 27, 1953

INVENTOR.
ROBERT C. MOORE
BY
Dean V. Hazeltine
ATTORNEY 2,773,118
Patented Dec. 4, 1956

2,773,118

TELEVISION DEFLECTION CONTROL SYSTEM

Robert C. Moore, Erdenheim, Pa., assignor to Philco Corporation, Philadelphia, Pa., a corporation of Pennsylvania Application July 27, 1953, Serial No. 370,299

7 Claims. (Cl. 178—5.4)

The present invention relates broadly to systems for displaying information in visible form, the present disclosure being a continuation in part of my copending U. S. patent application Serial No. 230,889 filed June 11, 1951, now Patent No. 2,671,129, issued March 2, 1954.

More particularly, it relates to cathode-ray tube systems which are supplied with a signal having different portions representative of different types of intelligence and which utilize this signal to control the intensity of the cathode-ray beam at the same time that the latter is swept across intervals of the cathode-ray tube screen adapted to display the aforesaid different types of intelligence. In such systems, accurate registry between the occurrence of intelligence representative portions of the signal and display intervals is clearly of paramount importance.

Systems which operate in the aforesaid manner are strikingly exemplified by the so-called dot-sequential color television systems, which are characterized by the employment of transmitted signals whose amplitude is, in rapid succession, indicative of three primary color components, such as red, green and blue, for example, of minute adjacent elements of a televised scene. To obtain such a signal, the scene to be televised may be viewed simultaneously by three different television cameras, respectively equipped with red, green and blue optical filters. These cameras scan the scene in synchronism and produce continuous video output signals whose respective amplitudes vary in accordance with the corresponding color content of the scene. These three output signals are then successively sampled, each at a very high rate, such as, for example, 3.5 million times per second, after which the sampled signals are combined and filtered so as to reject all signal components having a frequency above, say, 4 megacycles. The composite signal resulting from these various operations has a low frequency amplitude-varying component corresponding to the average brightness of the televised scene, and a high frequency component of 3.5 megacycle nominal frequency, but modulated in amplitude and phase in accordance with the coloration of the scene. At three time spaced intervals during each cycle of this 3.5 megacycle component, the total amplitude of the composite signal will thus be representative of information respecting the red, green and blue color components respectively of the televised scene. With the present standard horizontal scanning rate of cathode ray tube receivers at 15.75 kilocycles, this corresponds to approximately 186 intervals, during each horizontal sweep traversal of the receiver tube beam, at which the received signal is representative of any one color component.

Receiver systems are known, for use with such dot-sequential systems, which include a cathode ray tube having a screen on which minute phosphor elements are adjacently deposited in such a manner that every third element emits, in response to electron beam impingement thereon, light of one primary color, say red, for example, while the intervening elements emit green and blue light, respectively. The electron beam is then intensity-modulated by the received video signal and deflected across these elements so that it successively traverses all of the elements lying across the path of each horizontal scanning line.

One configuration which these screen elements have frequently been given is that of narrow stripes whose longer dimensions extend transversely to the direction of the horizontal scanning lines.

Proper color rendition of the televised scene was obtained with this transversely striped screen only if the electron beam was incident upon a stripe emissive of a certain color at exactly the same interval at which the beam intensity modulation was representative of intelligence respecting that color or, which is the same thing, when the received signal was representative of such intelligence.

Difficulties were encountered in the practical realization of this objective because of non-linearity of the cathode ray tube sweep circuits, unequal spacing of the light-emissive stripes across the scanning lines, and variations in the rate of occurrence of intelligence representative portions of the received signal proper due to varying phase delay in the transmitter-receiver path.

To overcome these difficulties, there were provided means for deriving, from the cathode-ray tube screen structure, indications of beam impingement upon certain phosphor stripes. These indications were then utilized to control the horizontal scanning rate of the beam across the stripes so as to compensate for improper color registry produced by the aforedescribed variations. Since each horizontal scan is completed in 1/15,750 seconds, it is apparent that very little time is available in which to effect this compensation, so that the control action must be very rapid.

Note that it is characteristic of dot-sequential systems that their transmitted and received signals are representative of intelligence respecting different colors at several intervals during each horizontal line scanning period. This makes it necessary to dispose the receiver tube color stripes transversely to the horizontal scanning lines, if all of the intelligence representative portions of the signal are to be utilized.

There are also known so-called line-sequential color television systems which are characterized in that the transmitted and received signals are representative of intelligence respecting a single color during an entire horizontal line scanning period. To display such a signal, the differently colored stripes of the receiver cathode-ray tube are arranged longitudinally of the direction of horizontal beam deflection, so that the beam remains impingent upon a single color stripe during any one horizontal line scan. This system is, however, not suitable for the display of dot-sequential signals whose color representativeness changes during the scanning of each line.

It is, accordingly, the principal purpose of the invention to provide a color television receiver which receives dot-sequential television signals and displays them by modulating an electron beam scanning transversely across the color stripes of the cathode-ray tube screen, and which nevertheless retains the superior accuracy of beam registry provided by a system whose beam scans longitudinally of these stripes.

It is another object of the invention to provide means for displaying a dot-sequential signal on a line sequential cathode ray tube screen.

It is another object of the invention to provide a novel scanning pattern for the beam of a cathode-ray tube having color stripes on its screen, whereby a dot-sequential signal is displayed even though the stripes are disposed longitudinally of the horizontal scanning direction.

It is another object of the invention to provide improved means for monitoring cathode-ray beam position in dot-sequential color television receivers and to utilize the monitoring indications so as to correct improper beam positioning.

It is still another object of the invention to provide a dot-sequential color television receiver which includes means for utilizing indications of cathode-ray beam position to control the vertical beam deflection so as to correct improper beam positioning.

It is a feature of apparatus embodying my invention that color registry is inherently entirely independent of the linearity of the horizontal deflection circuits.

To achieve the foregoing objects, as well as others which will appear, I provide the cathode ray tube of my receiver with a screen on which colored light emissive phosphor stripes, cyclically recurrent in the three primary colors, are disposed as in receivers for the line-sequential system, namely longitudinally of the line scanning direction. I also provide so-called "indexing stripes" whose detailed nature will be explained hereinafter and which parallel the light-emissive elements at intervals of every three such phosphor stripes. Note, in this connection, that line scanning is conventionally carried out by deflecting the electron beam of the cathode ray tube in two mutually perpendicular directions by the so-called horizontal and vertical deflection systems, respectively. As is well known, the direction of beam deflection produced by the horizontal deflection system acting alone is not exactly the same as the line scanning direction, but instead forms a small angle therewith. The deflection produced by the vertical deflection system, on the other hand, is at right angles to the direction of deflection produced by the horizontal deflection system and forms, therefore, the complementary angle with the line scanning direction. Thus the line scanning direction is, in effect, the resultant of the beam deflections produced by the horizontal and vertical deflection systems acting jointly. As is well known, the angle between the horizontal deflection direction and the line scanning direction depends upon the ratio of the horizontal deflection rate to the vertical deflection rate, the angle becoming smaller as this ratio is increased. In accordance with the invention, this ratio, and with it the inclination from the horizontal of the scanning lines, is chosen so that consecutive sweep traces of the beam are separated by approximately the vertical space occupied by three phosphor stripes and one indexing stripe. By virtue of this arrangement, the beam, which follows say the red stripe during its initial sweep traversal of a scanning field, will thereafter follow the red stripe of each group of three differently color-emissive stripes, as accurately as the sweep linearity will permit.

Further in accordance with the invention, there is superimposed, upon the deflection produced by one of these systems, rapidly reciprocating auxiliary deflection of constant amplitude and of a frequency substantially equal to the rate of recurrence of intervals at which the received signal is representative of intelligence respecting one particular color. The amplitude of this auxiliary deflection is chosen so that it extends over the space occupied by three adjacent phosphor stripes and at least one indexing stripe, this space being measured in the direction of auxiliary deflection. While this is not essential to the realization of the invention, for reasons which will appear, the auxiliary deflection direction is preferably chosen parallel to the vertical deflection direction. As a result of the application of this auxiliary deflection the beam will not only traverse its normal horizontal scanning path due to the combined action of the conventional horizontal and vertical deflection systems but will, in addition, carry out a reciprocating vertical displacement across a group of three differently colored light emissive screen elements. By selecting this auxiliary deflection frequency as hereinbefore specified, the beam is now made to traverse three differently colored light emissive elements during the time of occurrence of three consecutive signal intervals at which the signal is representative of information respecting the three different primary colors.

In the illustrative case hereinbefore assumed, in which the longitudinal and vertical deflection systems were so proportioned as to sweep the beam along consecutive red emissive phosphor stripes, this auxiliary deflection will then repeatedly deflect the beam from its path along the red stripe, causing it, during each deflection cycle, to traverse the nearest green, blue and indexing stripes as well. Since this auxiliary deflection is of relatively small amplitude, it is an easy matter to give it such form that the beam will traverse the differently colored stripes at the same time spaced intervals at which the signal is representative of different color information and so on consecutively for the other colors and in the same sequence. Since the beam, during each cycle of auxiliary deflection, also traverses at least one indexing stripe, the desired registry between intelligence representative portions of the received signal and beam incidence upon corresponding colored light emissive elements will be evidenced by one particular pattern of the signals produced by the indexing stripes. Means are then provided for sensing departures from this desired pattern and for producing a corrective deflection in a direction parallel to the auxiliary deflection direction so as to restore the desired indexing signal pattern which, so long as it prevails, is conclusive indication of registry between the aforesaid signal portions and beam incidence intervals.

Note that the manner in which the auxiliary deflection signal is produced is immaterial for the purposes of my invention, so long as it provides the aforedescribed beam impingement registry. In practice, however, a suitable source of such signal will be a received signal component often provided in dot-sequential color television systems and called the color synchronizing burst. This burst is a train of a few cycles of an oscillation superimposed on the trailing half of each line blanking pulse and of a frequency equal to the sampling rate. It is characterized in that its phase is independent of color information and indicative of the time of occurrence of video signal intervals respecting one particular color. Thus its frequency and phase provide a reference with respect to which color information representative signal portions may be located. In this respect, the color synchronizing bursts provide a particularly useful reference signal inasmuch as they undergo all of the varying phase delays to which the video signal is subject during transmission.

When utilizing these color bursts to produce the auxiliary deflection signal, the latter is given the same frequency as the oscillation of which the bursts consist, and a phase which is fixed relative to the phase of these oscillations.

The features and operation of specific apparatus provided for the performance of the above-described functions will be more readily understood from a consideration of the detailed discussion which follows when taken in conjunction with the accompanying drawings wherein.

Figures 1, 2, 3:
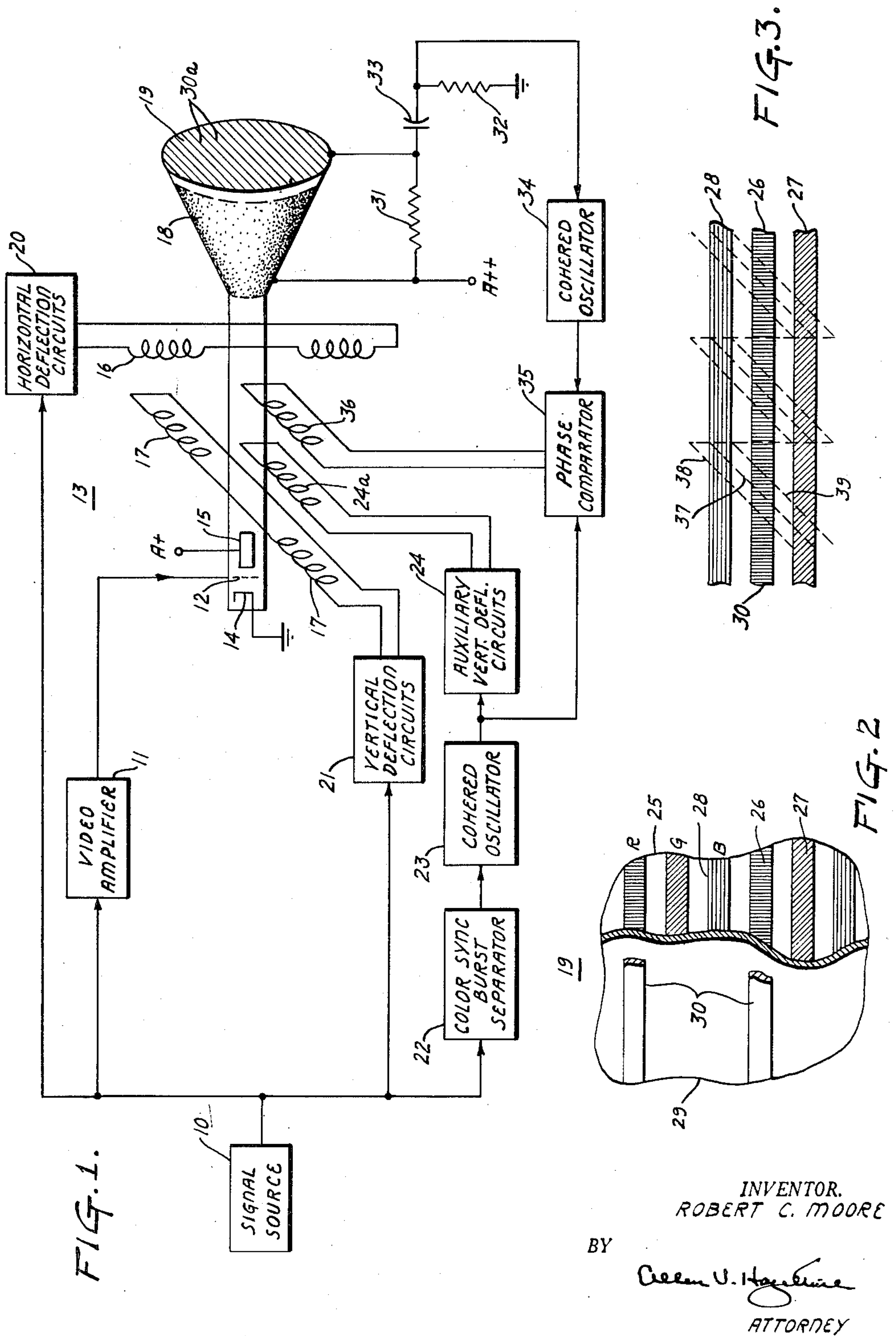
Figure 1 is illustrative of an embodiment of my invention in a color television receiver.
Figure 2 is an enlarged, fragmentary view of a portion of the screen structure of the cathode ray tube used as the signal display device in the embodiment of Figure 1 which will be useful in the explanation of certain aspects of the operation of this embodiment.
Figure 3 shows certain important relationships between the position of elements of the screen structure shown in Figure 2 and the scanning traversal of these elements by the electron beam.

There is shown, in Figure 1, to which more particular reference may now be had, a rectangle 10, designated "signal source" which will ordinarily comprise such conventional components of a television receiver as the antenna, tuner, radio frequency amplifier, converter, intermediate frequency amplifier and video detector. The output of this signal source 10 will then be a video signal whose amplitude is, at time-spaced intervals, representative of information respecting the red, green and blue color content of the scene being televised. At intervals of one receiver scanning line, this video signal will be briefly obliterated by a conventional blanking pulse upon the leading portion of which there is, as is usual, superimposed a horizontal synchronizing pulse, while upon the trailing portion thereof is pedestaled the aforementioned color synchronizing burst. In the exemplary case under consideration this burst is at a frequency of 3.5 megacycles. As has been indicated, the frequency and phase of this burst provide needed information at the receiver respecting the rate of occurrence of picture intelligence representative portions of the composite video signal and, furthermore, indicate at which interval during each cycle of this color signal the latter is representative of intelligence respecting one particular color. Since the order of occurrence of the intervals at which the color signal component is representative of information respecting the different color components is usually maintained constant, the indication provided by the synchronizing burst phase respecting one of these colors is sufficient to define the times of occurrence of the portions representative of intelligence of the other two colors, inasmuch as these follow the first one in the same order and at predetermined spacings. This color synchronizing burst is utilized in practicing the invention in a manner hereinafter described.

The composite video signal which appears at the output of signal source 10, or at least such portions thereof as are representative of color information, are then supplied to conventional video amplifier 11 and thence to the beam intensity control grid 12 of cathode ray display tube 13, where they serve to modulate the intensity of the electron beam emitted by cathode 14 in the manner common to color television receivers. Cathode ray tube 13 is further equipped with a conventional accelerating anode 15 connected to a suitable source of unidirectional positive potential A+, as well as with horizontal deflection coil 16, vertical deflection coil 17, a second anode 18 which is connected to a source of positive second anode potential A++, and a screen structure 19 whose features are described in detail hereinafter. While this particular cathode ray tube has been shown to be equipped with electromagnetic deflection systems, it will be understood that the invention is by no means limited thereto and that electrostatic deflection systems may be used in their place in accordance with the well known interchangeability between electrostatic and electromagnetic deflection systems. At the same time that the output of signal source 10 is supplied to video amplifier 11, it is also supplied to conventional horizontal deflection circuits 20 which respond thereto in the usual manner to provide a sawtooth current wave for application to horizontal deflection coils 16 which, in turn, produce deflection of the beam in a horizontal direction across the screen structure 19. The composite video signal derived from signal source 10 is also supplied to conventional vertical deflection circuits 21 which are responsive thereto to provide a suitable sawtooth wave of output current for application to vertical deflection coil 17 where it acts upon the electron beam of the cathode ray tube 13 to deflect the latter repetitively in a vertical direction across screen structure 19. Still another circuit to which the composite video output signal of signal source 10 is supplied is color synchronizing burst separator 22. This circuit is characterized by being responsive only to the aforedescribed color synchronizing bursts and being substantially non-transmissive of all other components of the composite video signal. Such a separator may take any one of several known forms; for example it may consist of an amplitude separating circuit followed by a filter, the separating circuit being one which rejects all signals below the blanking pulse level, thereby eliminating all but the horizontal synchronizing pulses and the color synchronizing bursts immediately. The filter is designed to transmit signals of the sampling frequency, in this case 3.5 megacycles, to the substantial exclusion of all other signals. Thereby the horizontal deflection synchronizing pulses are also rejected, leaving, at the output of this filter, only the separated color synchronizing bursts. Since these bursts are intermittent in character and since, for reasons which will appear, it is desired to obtain a continuous signal having the same frequency and phase characteristics as the color synchronizing bursts, these latter are supplied, after separation, to a cohered oscillator 23 which produces just such a continuous signal having the same frequency and phase characteristics as the received color synchronizing bursts. There is thus available, at the output of cohered oscillator 23, one of the signals hereinbefore described as being required for the operation of my system, namely a signal whose frequency is indicative of the rate of occurrence of color information representative portions of the received video signal, and whose phase is indicative of the relative time of occurrence of the intervals representative of different color information. This output signal of cohered oscillator 23 is now, first of all, supplied to auxiliary vertical deflection circuits 24 which produce a sawtooth signal wave of current of the same frequency as the output signal of cohered oscillator 23 and having a gradually and preferably linearly rising portion, followed by an abruptly falling portion.

Conventional circuits are known which will produce sawtooth current waves of any desired frequency and from these, specific arrangements for use as auxiliary vertical deflection circuits 24 may be selected. The current produced by auxiliary deflection circuits 24, and which has the form hereinbefore described is supplied to auxiliary deflection coil 24*a* where it produces a correspondingly varying magnetic field which, in turn, deflects the beam cyclically from the vertical position which it occupies by virtue of the main vertical deflection produced by vertical deflection circuits 21. Specifically, an auxiliary deflection signal having the form described as being produced by circuits 24 will cause the electron beam to depart slowly from its initial position during the rising portion of the current waveform. In the absence of main horizontal and vertical deflection the beam would then return almost instantaneously to the aforesaid initial position due to the sharply falling portion of the waveform. However during the time when one cycle of the auxiliary deflection takes place, the beam will have progressed by a small amount along its main vertical deflection path, as a result of which the beam, at the completion of a cycle of auxiliary deflection, will not actually return to the same vertical position which it occupied at the beginning of this cycle but will instead terminate at whatever vertical location is then determined by the main vertical deflection circuit. Similarly, some horizontal deflection of the beam by virtue of the horizontal deflection circuits 20 will have taken place during this one cycle of the auxiliary vertical deflection. As a result of the combined effects produced by this vertical and horizontal deflection, the resultant deflection pattern produced by the interaction of these two main deflection systems and of the auxiliary deflection system will be the ordinary scanning raster of a conventional cathode ray tube modified so that each scanning line actually consists of a large number of small amplitude sawtooth oscillations.

Inasmuch as the second signal required for the operation of my system is derived from the screen structure of the cathode ray tube 13, as hereinbefore generally indicated, it is in order now to describe this structure in more detail. Since the screen structure, which is generally designated by reference numeral 19 in Figure 1, is composed of numerous minute elements in close juxtaposition, an enlarged fragmentary section thereof has, for the sake of greater clarity of exposition, been reproduced in Figure 2, to which reference may now be had. Screen structure 19 is seen to be comprised of the face plate 25 of cathode ray tube 13, upon which there are deposited a plurality of closely spaced phosphor stripes 26, 27 and 28. Of these stripes, all those designated 26 are constituted so as to be emissive of red light in response to electron beam impingement thereon, while those designated 27 will emit green light in response to the same stimulus and those designated 28 will emit blue light. The manner in which such particular light emission is produced is well known and need not be further discussed here. Note that stripes emissive of light of any one of the three aforesaid colors are cyclically recurrent at intervals of every three stripes. Deposited over all of these phosphor stripes there is an extremely thin layer 29 of some electron permeable material such as aluminum and on top of this aluminum layer 29 there are in turn deposited stripes which parallel the phosphor stripes and which are characterized by having a secondary electron emission ratio in response to beam impingement thereupon which is substantially different from that of the aluminum layer. These stripes 30 are known as indexing stripes and are conventionally made of some material having a high atomic number, such as gold for example. These indexing stripes 30 are normally disposed at intervals of three phosphor stripes. Thus, in the illustrative case under consideration, indexing stripes 30 are seen to be located directly above each red light emissive stripe 26. It is these indexing stripes 30 of Figure 2 which are schematically represented by single lines 30*a* shown on screen structure 19 in Figure 1. Furthermore, the number of such diagrammatically indicated indexing stripes 30*a* is in practice much greater than that shown, the number illustrated having been reduced to a nominal figure so that individual indexing stripes are distinguishable. With a standard 525 line system, there will, ordinarily, be over 500 such indexing stripes on the tube face, clearly a prohibitively large number for representation in the small space available.

Referring now to both Figures 1 and 2, the horizontal and vertical deflection circuits 20, 21 of my novel receiver system are preferably so proportioned that the beam, in the absence of any auxiliary vertical deflection, traces a path across the tube screen 19 following green light emissive stripes 27, these being, in each case, the stripes immediately below the red-light-emissive phosphor stripes, which latter, in turn, have superimposed thereon the indexing stripes 30. If, in addition, the standard interlaced scanning system is adhered to, the beam will be made to follow every other green light emissive phosphor stripe during the scanning of one field, and it will further follow the intermediate alternate green light emissive stripes on the next successive field. The sawtooth current wave produced by auxiliary vertical deflection circuits 24, as hereinbefore mentioned, is now applied to auxiliary deflection coil 24*a* with such a polarity as to produce upward deflection of the electron beam during the slowly rising portion of the wave, followed by a rapid, almost instantaneous downward sweep of the beam during the falling portion of the sawtooth wave. As has been indicated, the amplitude of this wave is chosen so that the beam excursion which it produces extends over a group of three adjacent phosphor stripes. Starting from any green stripe 27, therefore, the beam will sweep slowly across the next upwardly adjacent phosphor stripe, which happens to be the red stripe 26, and then across the upwardly adjacent blue stripe 28, after which it will return almost instantly to impingement upon the green stripe 27 from which its upward movement initiated.

This will appear more clearly with reference to Figure 3, where there is illustrated a single set of three adjacent phosphor stripes 26, 27 and 28, it being understood that an indexing stripe 30 is superimposed on the central stripe 26 of the set, so that the two are indistinguishable from the particular angle of view of the figure. Different paths which the electron beam may follow during a line scanning traversal are shown in this figure. Broken line 37 indicates the normal sawtooth path hereinbefore described which is seen to lead generally from left to right from the bottom of green stripe 27, across red stripe 26, to the top of blue stripe 28, after which it returns abruptly to the bottom of stripe 27 and thence resumes its next gradual upward sweep. During traversal of red light emissive phosphor stripe 26, the beam will, of course, also be impingent upon index stripe 30 which is superimposed thereon. As a result, the secondary emission current flowing to second anode 18 will increase considerably during the interval of beam impingement upon red light emissive phosphor stripe 26. This increased current flow will cause increased conduction through resistor 31, shown in Figure 1, which completes the return circuit between screen 19 and second anode 18. This surge of current is then applied, by way of pulse forming network 32, 33 to cohered oscillator 34 where it produces a substantially sinusoidal output signal having the same phase and frequency characteristics as the indexing signal derived from stripes 30. If, now, the vertical deflection produced by the main vertical deflection circuits 21 is of precisely the right value so that the path of the beam, due to auxiliary vertical deflection, is as shown by line 37 of Figure 3, then the beam can always be expected to traverse the indexing stripe 30 at the same time after the inception of each cycle of auxiliary deflection, this being the equivalent of saying that the phase of the signal produced by the indexing stripe will always be constant relative to the phase of the auxiliary vertical deflection signal. Observe now that, if the main vertical deflection should take place too slowly at any time, then the beam will be vertically displaced in an upward direction from its desired initial position and this initial upward displacement will be maintained throughout its deflection by the auxiliary deflection signal. Broken line 38 of Figure 3 shows the path of the beam under these conditions and indicates that the beam will traverse indexing stripe 30 sooner after the beginning of the auxiliary deflection cycle than would normally be the case. This, in turn, will produce a premature occurrence of the indexing signal, corresponding to a phase advance of the indexing signal relative to the auxiliary deflection signal. The opposite effect will take place if the main vertical deflection is too rapid, for then a downward error will appear in the beam position during its auxiliary vertical deflection, so that it will traverse indexing stripe 30 later than it would under conditions of accurate vertical deflection, thereby producing a phase delay of the indexing signal relative to the phase of the auxiliary vertical deflection signal. This condition is shown by broken line 39 of Figure 3. Since such phase changes of the indexing signal are faithfully reflected by the output signal of cohered oscillator 34, whereas the phase of the output signal of cohered oscillator 23 is representative, and indeed determinative of the phase of the auxiliary vertical deflection signal produced by circuits 24, these respective output signals of cohered oscillators 23 and 34 may be compared to determine both the magnitude and the sense of their relative phase variations, which have been shown to be a measure of the accuracy of main vertical beam deflection. To put this information into useful form, the output signals of the two cohered oscillators are simultaneously supplied to the two input circuits of a conventional phase comparator 35, which is operative in well known manner to produce a unidirectional output potential proportional to the instantaneous phase difference between the signals from cohered oscillators 23 and 34. It is then a simple matter to utilize this output potential of phase comparator 35 to produce a deflection current in correction coil 36 of sufficient magnitude to counteract all departures of the vertical beam deflection from its desired value. For this purpose it suffices to determine the constant value of phase difference between signals from cohered oscillators 23 and 34 which corresponds to the proper vertical deflection condition on tube screen 19 and to proportion the phase comparator 35 in such a manner as to produce no corrective output potential when this particular phase difference between the cohered oscillator output signal prevails. Furthermore, the phase comparator may be arranged to produce a current flow through correction coil 36 which is of such polarity as to deflect the cathode ray beam additionally downward whenever the phase of the signal from cohered oscillator 34 advances with respect to the phase of a signal from cohered oscillator 23, while producing a current flow of the opposite polarity whenever the signal from cohered oscillator 34 is delayed with respect to that from cohered oscillator 23. It will be understood, of course, that additional D. C. amplification may be provided between the output of phase comparator 35 and correction coil 36 as required.

Note, in this connection, that separate coils have been shown in Figure 1 for purposes of main vertical deflection, auxiliary vertical deflection, and correction. When such separate coils are employed, it may be necessary to bunch them very closely together due to the limited space available along the cathode ray tube neck. In that event, precautions may have to be taken to prevent interaction between the various coils. This may be done by tuning the auxiliary deflection coil to the frequency of the auxiliary deflection signal, while tuning the correction coil to the much lower frequency range in which variations in the phase comparator output potential occur. Ordinarily, no special effort need be made to prevent interference with the main vertical deflection coil, since the latter is iron cored and therefore responsive only to the very low frequency vertical deflection signals. Alternatively, a special coil may be designed for combining the functions of all three coils shown.

The system hereinbefore described can now be seen to be operative to produce beam impingement upon a phosphor stripe emissive of light of one particular color always at the exact interval at which the received signal is representative of intelligence regarding this color. This is due to the fact that vertical deflection is accurately controlled, while actual beam impingement is independent of horizontal deflection and is, instead, dependent only on the auxiliary vertical deflection, this latter being in turn synchronized with the times and rate of occurrence of intelligence representative signal portions by means of the color synchronizing bursts.

Observe that the link between phase comparator 35 and the received color synchronizing burst is necessary only when it is contemplated that the rate of occurrence of intervals at which the received signal is representative of intelligence will not be substantially uniform. If that rate be uniform, then a stable local oscillator may be the source of auxiliary vertical deflection signals and may likewise be connected to phase comparator 35 to provide a reference for deviations in the phase of the index signal.

Several ancillary aspects of the invention now remain to be considered.

First it will be noted that the preceding discussion has been directed to a system in which the auxiliary deflection parallels the main vertical deflection and in which signals indicative of improper beam positioning are utilized to correct the rate of main vertical deflection. This is the preferred arrangement because control of a slowly varying parameter like the vertical deflection rate promotes greater accuracy. Nevertheless, substantial improvements over prior art arrangements can still be achieved by providing auxiliary beam deflection in a direction parallel to the main horizontal deflection, in which case correction of the main horizontal deflection rate must be effected. Beyond rotating the auxiliary deflection coil *24a* and the correction coil 36 of Figure 1 through a 90° angle so as to produce horizontal instead of vertical deflection, the only change required for this modified operation is a readjustment of auxiliary deflection circuits 24 to produce a sawtooth current wave of sufficient amplitude to cause the beam to traverse horizontally a group of three adjacent phosphor stripes of the screen structure during each cycle of auxiliary deflection.

Note further that, in the system hereinbefore described, a certain signal output from indexing strips 30 will be produced not only during the gradual upward deflection of the beam produced by the rising portion of the auxiliary deflective wave, but also during the extremely rapid downward passage of the beam across the index stripe due to the rapidly falling portion of this deflection wave. This latter signal will, however, be of extremely short duration, due to the fact that the beam impinges on the index stripes only very briefly during the falling portion of the auxiliary deflection cycle. The energy content of this signal will, therefore, be extremely low so that it will ordinarily be unable to affect the operation of the remainder of the system and particularly the phasing of cohered oscillator 34, as established by the phase of the indexing signal produced during the rising portion of the sawtooth wave. If the downward slope of the sawtooth auxiliary deflection wave is not as steep as here contemplated, then the beam may produce, during its downward traversal of the indexing stripe, a signal of duration and energy content comparable to that produced during its upward traversal of the indexing stripe. Such signals may improperly affect the phasing of oscillator 34 and it will, therefore be necessary to provide auxiliary means for blanking the beam during its downward deflection interval so that no signal at all will be produced by the index stripe during downward beam traversal thereof. The same reasoning applies to the spurious emission of red light from the color stripe 26, lying beneath index stripe 30, which may occur during the rapid downward return of the beam at the end of the auxiliary deflection cycle. Here, again, the duration of this light emission will be normally so small as to be unappreciable, but any disturbance caused thereby may again be eliminated by blanking of the beam during this return interval.

In fact, such blanking techniques make it feasible to use auxiliary deflection waveshapes other than the sawtooth waxe hereinbefore contemplated. For example, the auxiliary deflection signal may take the form of a sinusoidal wave, during whose downward sloping portion the cathode ray beam may be blanked by a signal suitably delayed with respect to the beginning of each auxiliary deflection cycle. In any of these cases where blanking becomes necessary, this may be simply effected by deriving a signal indicative of the beginning of each auxiliary deflection cycle, delaying the signal so that it occurs at the time when blanking is required and then supplying the signal to electron beam intensity control grid 12 with such polarity as to cut off the electron beam during the required interval.

I have also found that it is not essential that the indexing stripes of the cathode ray tube be located, as in the embodiment of Figure 1, in the center of the group of three phosphor stripes which the electron beam is intended to scan during each horizontal deflection. On the contrary, other patterns of index stripe locations relative to the locations of the phosphor stripes can sometimes be used to good advantage. This is particularly true of an indexing stripe arrangement in which there is provided a pair of indexing stripes for each group of three differently colored phosphor stripes and in which the different members of each pair of indexing stripes are located near opposite longitudinal edges of the associated group of phosphor stripes. It may be shown that a system which uses such a modified indexing stripe arrangement has much higher sensitivity to scanning errors than a system which has a single centrally located indexing stripe for each group of three phosphor stripes. By this I mean that a given departure in beam trace from its desired path will produce a much more intense indication in this modified system than in the system of Figure 1. However, the indication of scanning error will not only be of a different magnitude in the modified system, but also of a different kind, manifesting itself principally in the form of amplitude variations rather than in the form of phase variations. This, in turn necessitates certain concurrent modifications in the circuits which must be provided to utilize the indexing indications to best advantage. All of the foregoing will be better appreciated from the detailed description of a color television receiver system which uses the modified indexing stripe arrangement under consideration in its cathode ray tube and which is illustrated in Figure 4, to which particular reference may now be had.

This system is similar to that of Figure 1 in a number of respects, and elements which are identical in both cases have therefore been designated by identical reference numerals. For example, the system of Figure 4 includes a signal source 10 which may be identical in all respects to the source 10 of Figure 1 and which is therefore productive of the same conventional color television signal at video frequencies as was described in connection with Figure 1. The system of Figure 4 also includes a video amplifier 11 and a cathode ray tube 13*a* which, like tube 13 of Figure 1, is equipped with cathode 14, beam intensity control grid 12, first and second anodes 15 and 18, and deflection coils 16, 17, 24*a* and 36, all of which may be substantially identical to the similarly designated elements of Figure 1. The same is true of the horizontal deflection circuits 20, the vertical deflection circuits 21, the color synchronizing burst separator 22 and the cohered oscillator 23 of the system of Figure 4. Since each of the foregoing elements is identical to the corresponding element of Figure 1, and since their interconnections are also alike, no detailed description thereof need be given here. Suffice it to recall that the picture intelligence representative video signal from source 10 is supplied to cathode ray tube grid 12 through video amplifier 11 and that a conventional horizontal and vertical scanning pattern is imparted to the electron beam generated by cathode 14 by means of the main horizontal and vertical deflection circuits and their associated deflecting coils. In addition there is available, at the output of cohered oscillator 23, a continuous signal whose frequency is indicative of the rate of occurrence of colored light intelligence representative intervals in the received video signal. The manner in which this oscillator output signal is utilized is discussed hereinafter.

Figure 4:
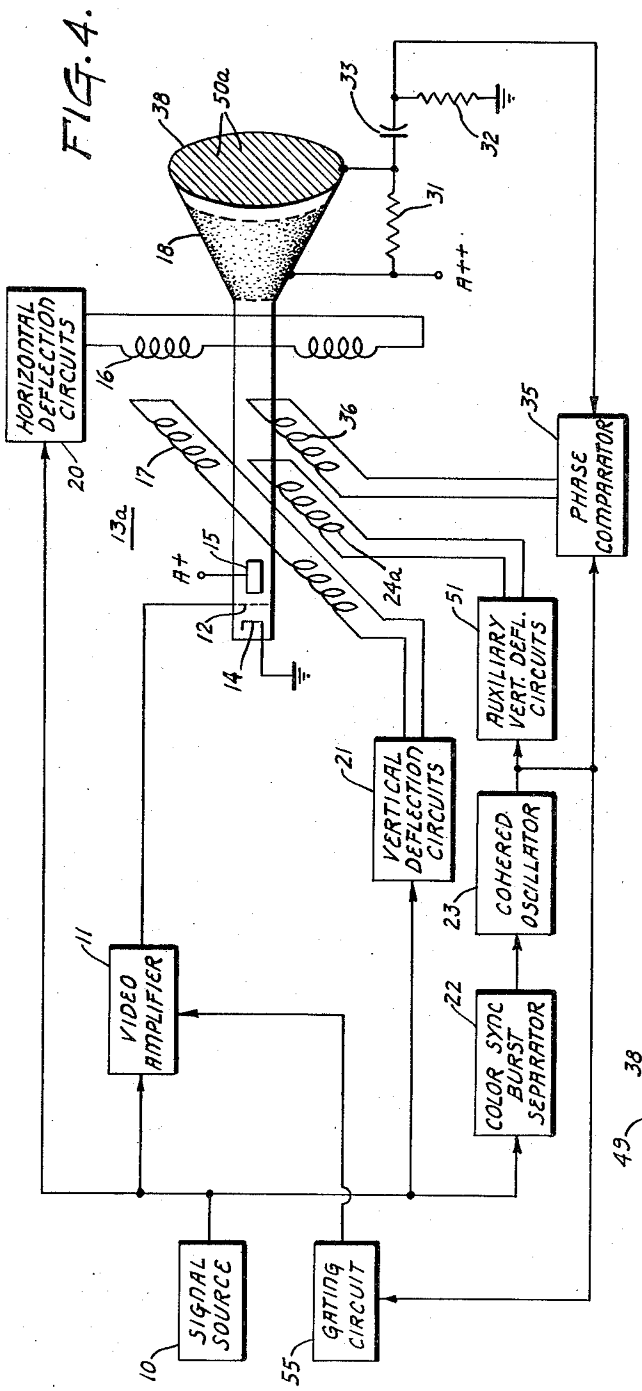
Figure 4 is illustrative of an embodiment of my invention in a color television receiver which has certain marked advantages over the embodiment of Figure 1.
Figure 5:
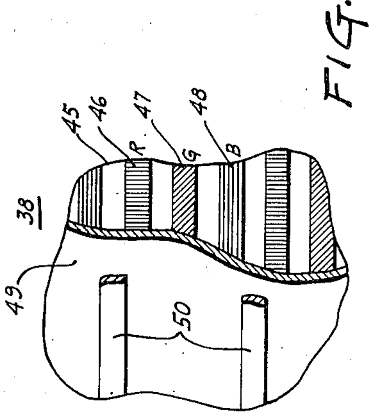
Figure 5 is an enlarged, fragmentary view of one form which the screen structure of the cathode ray tube used in the embodiment of Figure 4 may take.

Proceeding now to a consideration of the differences between the systems of Figures 1 and 4, it will be noted first that the details of construction of the screen structure 38 of Figure 4 are not like those of the screen structure 19 of Figure 1. The details of construction of this screen structure 38 are shown in Figure 5 of the drawings to which more particular reference may now be had. As illustrated therein, the screen structure 38 may comprise a substrate 45 which is preferably made of a transparent material such as glass and upon which there are deposited spaced, parallel phosphor stripes. Every third one of these stripes is made of a phosphor material emissive of light of a particular primary color which is different from the color which each of the intermediate stripes emits. In the particular arrangement illustrated, the stripes designated 46 are emissive of red light while the stripes 47 are emissive of green light and the stripes 48 are emissive of blue light. Over all of these phosphor stripes there is deposited an extremely thin layer 49 of an electron permeable material such as aluminum and on top of this aluminum layer 49 are in turn deposited stripes 50 which parallel the phosphor stripes and which are characterized by having a secondary electron emission ratio which is substantially different from that of the aluminum layer. In the particular arrangement of Figure 5 these stripes 50 are disposed at intervals of three phosphor stripes and are seen to be located directly above the space between each two adjoining blue and red stripes. It will now be seen that the screen structure of Figure 5 differs from that illustrated in Figure 2 principally in that the indexing stripes have been displaced by approximately the width of a phosphor stripe so that they no longer line up directly with a phosphor stripe but rather with the space between two adjacent phosphor stripes.

The indexing stripes 50, shown in detail in Figure 5, are schematically represented in Figure 4 by parallel lines 50*a* on the screen 38 of cathode ray tube 13*a*. It will be seen that these indexing stripes, and also the phosphor stripes which parallel them, are disposed generally parallel to the direction of horizontal beam deflection.

The relative rates of main horizontal and vertical deflection are so selected that the beam, if not otherwise deflected, will trace successive horizontal paths along successive green phosphor stripes. Of course, if interlaced scanning is used, then the beam will be caused to scan every other green phosphor stripe on one field scan, and the intervening green phosphor stripes during the next field scan.

As in the case of the system of Figure 1, there is imparted to the electron beam of the system of Figure 4 not only the main horizontal and vertical deflection, which is conventionally provided both in black-and-white and color television receivers, but also an auxiliary vertical deflection synchronized with the color synchronizing burst and so proportioned in amplitude and phase as to sweep the electron beam repetitively across three adjacent phosphor stripes in such a manner that the beam normally impinges upon a phosphor stripe emissive of light of a particular color at the instant at which the video signal is representative of intelligence concerning this particular color. This auxiliary deflection is produced by auxiliary vertical deflection coil 24*a* when supplied with a suitable deflecting signal from auxiliary vertical deflection circuits 51. These auxiliary vertical deflection circuits are in turn synchronized with the color synchronizing signal burst by the output signal from cohered oscillator 23 which is utilized to determine the frequency and phase of the auxiliary deflection signal. However, while in the system of Figure 1 the auxiliary vertical deflection circuits 24 were so constructed as to produce a sawtooth wave of deflection current in the auxiliary deflecting coil 24*a*, the auxiliary vertical deflecting circuits 51 of the system of Figure 4 are preferably so constructed as to produce a sinusoidal wave of deflecting current in the auxiliary deflection coil. Consequently the electron beam of cathode ray tube 13*a* will be deflected back and forth along a sinusoidal path about the particular green phosphor stripe upon which it impinges in the absence of the auxiliary vertical deflection signal. By appropriate selection of the auxiliary signal amplitude, the beam is caused to impinge upon the nearest red light emissive phosphor stripe during its deflection upwardly from the green stripe, and upon the nearest blue light emissive phosphor stripe during its deflection downwardly from the green stripe.

Figure 6:
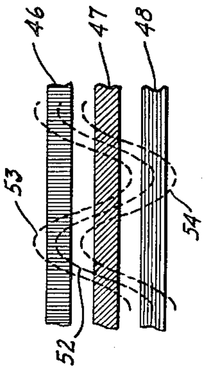
Figure 6 shows certain important relationships between the position of elements of the screen structure shown in Figure 5 and the scanning traversal of these elements by the electron beam.

This will appear more clearly by reference to Figure 6, where there is illustrated a single set of three adjacent phosphor strips 46, 47 and 48, it being understood that an indexing stripe 50 adjoins the upper edge of stripe 46 and another indexing stripe 50 adjoins the lower edge of stripe 48. Different paths which the electron beam may follow in the course of a line scanning traversal of the screen are shown in this figure. Broken line 52, in particular, indicates the normal sinusoidal path hereinbefore described which is seen to lead generally from left to right from green stripe 47 upwardly into red stripe 46, then down again through green stripe 47 into blue stripe 48, then up again through green stripe 47 to red stripe 46, and so on recurrently. It will be seen that during its traversal of the normal sinusoidal path 52 the beam will not travel appreciably beyond the upper edge of the red phosphor stripe 46 or below the lower edge of the blue phosphor stripe 48. As a result, the beam will not impinge to any appreciable extent upon either of the indexing strips 50 which lie beyond these edges and no changes in the secondary emission current flowing to second anode 18 will occur at any time, nor will signal variations appear in the screen output resistor 31 which interconnects the second anode 18 and the screen structure 38. Therefore, whenever the electron beam follows its normal scanning path, there will be applied to phase comparator 35 a signal of zero amplitude from the cathode ray tube by way of R-C filter network 32, 33, and another signal of fixed amplitude from cohered oscillator 23. In response to these signals the phase comparator 35 will produce an unvarying output signal. In particular, if this phase comparator is constructed, in any conventional manner, so as to be balanced for the signal applied to it from cohered oscillator 23, then it will produce zero output during such times. Consequently no current will flow through the correction coil 36 and the beam will continue along its normal scanning path without corrective upward or downward deflection.

If, however, the vertical deflection produced by the main vertical deflection circuits 21 takes place too slowly, then the beam will be vertically displaced in an upward direction from its desired position at every point along its path. Broken line 53 of Figure 6 shows the path of the beam under these conditions and indicates that the beam will now encroach on the indexing stripe which adjoins the upper edge of red stripe 46 to an appreciable extent. This, in turn, will cause the development, across the output resistor 31 of the cathode ray tube, of a series of indexing pulses which occur in time coincidence with the successive encroachments of the electron beam on the region occupied by the indexing stripe and which have amplitudes determined by the extent of these encroachments. R-C network 32, 33 is constructed, as has been indicated in the description of Figure 1, to transmit signals of the fundamental frequency of these indexing pulses. Consequently this filter will transmit to phase comparator 35 a signal of a frequency equal to the rate of recurrence of the pulses, of amplitude proportional to the amplitude of the pulses, and of a phase indicative of the times of occurrence of these same pulses. The application to the phase comparator 35 of this signal, together with the signal from cohered oscillator 23, will cause an unbalancing of the phase comparator which in turn will cause the development of an output potential and corresponding current flow through correction coil 36. It is apparent that, by proper selection of the parameters of the phase comparator and of the correction coil, this current can be made to flow in such a direction as to cause an additional downward deflection of the electron beam beyond that which is produced by the main vertical deflection system, and that this additional deflection can be made of such magnitude as to restore the beam to its desired scanning path 52 across the group of three phosphor stripes. Conversely, if the main vertical deflection takes place too rapidly, then the entire trace of the electron beam will be displaced downwardly from its desired location. This is diagrammatically represented by broken line 54 in Figure 6. In that event the beam will encroach on the region occupied by the indexing stripe 50 which adjoins the lower edge of blue phosphor stripe 48 and pulse signals will be produced in resistor 31 in time coincidence with the occurrence of such encroachment and of amplitudes proportional to the extent of encroachment. As will be apparent from an inspection of Figure 6, the pulses which are produced when the beam is too low occur at instants which are equidistant from consecutive instants at which indexing pulse signals are produced when the beam is too high. Consequently the fundamental component of the pulse signals produced when the beam is too low, which is derived from the screen output resistor 31 by R-C network 32, 33, will have a phase which is opposite to the phase of the signal derived when the beam is too high. Application of this signal of opposite phase to the phase comparator 35 will unbalance it in the sense opposite to that produced by the first discussed signal so that an output potential of the opposite polarity and a deflection correction current of the opposite polarity will be produced. When this latter deflection current flows through coil 36 it will deflect the beam vertically upward by an amount which is just sufficient to restore the beam to the desired scanning path across the phosphor stripes.

It will be recalled that, in the dot sequential color television system to which the invention is particularly applicable, intervals at which the signal is representative of three different primary colors of the televised image normally recur in a fixed sequence. For example, the received signal may be representative of red color intelligence during one interval, of green color intelligence during the next interval, and of blue color intelligence during the next interval, and so on recurrently. In the system of Figure 4, however, and particularly by reference to Figure 6, it will be seen that the electron beam appears to traverse a green light emissive phosphor stripe twice as often as it does either a red or a blue light emissive phosphor stripe. If this were actually permitted to occur, then the order in which light of the different colors is produced by the system of Figure 4 would be red, green, blue, green, red, green, blue, green, and so on recurrently. Since this order of light emission differs from the aforementioned order of occurrence of different color representative portions in the signal it will immediately be apparent that improper color reproduction would result. This difficulty is conveniently eliminated by blanking the beam during each upward deflection across a group of three phosphor stripes. Such beam blanking may be accomplished by means of a conventional gating circuit 55 which consists of a pulse shaping circuit responsive to a predetermined portion (e. g. the peak) of each cycle of the cohered oscillator output signal to produce a pulse of negative polarity whose duration is substantially equal to the duration of the aforementioned trace portion during which it is desired to blank the beam, and which is of sufficient amplitude to render a vacuum tube of the video amplifier to which it may be applied non-conductive during its occurrence. Since the interval during which it is desired to blank the beam always occurs during the same portion of each cycle of the output signal of cohered oscillator 23, it is a simple matter to control the time of application to the video amplifier of the aforementioned gating pulses, by means of delay lines or otherwise, so that this application of gating pulses and the occurrence of intervals during which gating is desired coincide. Alternatively gating pulses of positive polarity may be applied, during the same intervals, to the cathode 14 of the cathode ray tube. If these latter pulses are of sufficient amplitude they will drive the cathode so far positive relative to the grid 12 that the electron beam will be cut off.

It will be noted that, with the gating schemes hereinbefore described, the beam will impinge with signal representative intensity upon a group of three phosphor strips during each downward auxiliary deflection, but will be blanked during each upward deflection. Since the upward and downward deflection intervals are substantially equal, a considerably greater interval of time will elapse between illumination of the last phosphor scanned during one downward deflection and the first phosphor scanned during the next downward deflection than will elapse between illuminations of consecutive phosphor strips scanned during any given downward scan. If this timing corresponds to the timing of the intelligence representative portions in the received signal, and if the comparatively long interval without illumination, which occurs after each downward auxiliary deflection, is not objectionable to an observer, all is well. On the other hand, it may sometimes be preferred to space more uniformly the intervals at which illumination of the different phosphor strips is produced. In an arrangement like that of Figure 4, this can readily be accomplished by gating the received signal and/or the cathode ray beam off not just once, but three times during each cycle of auxiliary deflection—namely, each time the beam sweeps upwardly across a red phosphor stripe, each time it sweeps downwardly across a green phosphor stripe and each time it sweeps upwardly across a blue phosphor stripe. To bring this about, the gating circuit 55 need merely be rearranged, in conventional manner, to produce gating pulses at three times the former rate. The instants of occurrence of these pulses, relative to the instants during which it is desired to suppress the beam, can again be determined by a suitably proportioned delay line included in the output circuit of the gating circuit 55.

In the system of Figure 4, as heretofore described, the indexing stripes have been confined to the spaces between adjacent phosphor stripes. This is not essential, for the width of these indexing stripes may suitably be increased until they extend somewhat into the region occupied by the immediately adjacent phosphor stripes. If the indexing stripes are widened in this manner, then the beam will evidently impinge upon an indexing stripe at each extreme of each sinusoidal excursion, even when it is following its proper path centered within a group of three phosphor stripes. However, during properly centered scanning, the beam will encroach on the indexing stripes equally at both extremes of the auxiliary deflection, so that pulses of uniform amplitude, occurring at twice the auxiliary deflection rate, will be produced. Such pulses have no appreciable component at the index frequency—i. e. at the auxiliary deflection frequency—and their presence will therefore have no adverse effect on the operation of the indexing system.

Evidently the same result would be produced if, instead of the width of the indexing stripes, the amplitude of the auxiliary deflection were increased to such an extent that the beam impinged on both indexing stripes even when it was following the desired path.

As has been pointed out, it may be shown for any of the foregoing cases that the sensitivity to departures of the beam from the desired scanning path is greater for a system in which the beam is deflected between limits defined by a pair of indexing stripes than for a system like that of Figure 1 where the auxiliary beam deflection is centered about the index stripe.

In each of the two systems considered heretofore, namely in those of Figures 1 and 4, the useful indexing signal derived from the screen structure has a frequency which is nominally equal to the rate at which the beam makes successive traversals of groups of three phosphor stripes. Under normal circumstances, namely when it is desired to reproduce amounts of light of the different primary colors with different intensities, the picture representative video signal will be subject to amplitude variations at approximately the same rate. Since the beam is modulated with this video signal, its intensity will also be varying at this same rate when it impinges upon the screen structure. Furthermore, as is well known, the secondary electron emission from the screen structure, and particularly from the indexing elements, is a function of the intensity of the impinging beam. Therefore the signal which is developed across screen output resistor 31 by the flow of secondary emission current therethrough will be subject to variations not only due to beam traversal of successive indexing and non-indexing portions of the screen structure, but also due to the aforementioned variations in beam intensity in accordance with video intelligence. Since, as has been explained, variations from both of these causes lie in the same frequency range, it may be difficult to distinguish them from each other. Yet it will be clear that some distinction between them should be made before applying them to the phase comparator 35, for if that is not done then variations in the indexing signal which are due to variations in beam intensity will unbalance the phase comparator even though the beam may be scanning along its desired path across the screen structure. If that should happen, a spurious correction signal would be produced by this phase comparator and the beam might actually be deflected away from its desired scanning path.

Figure 7:
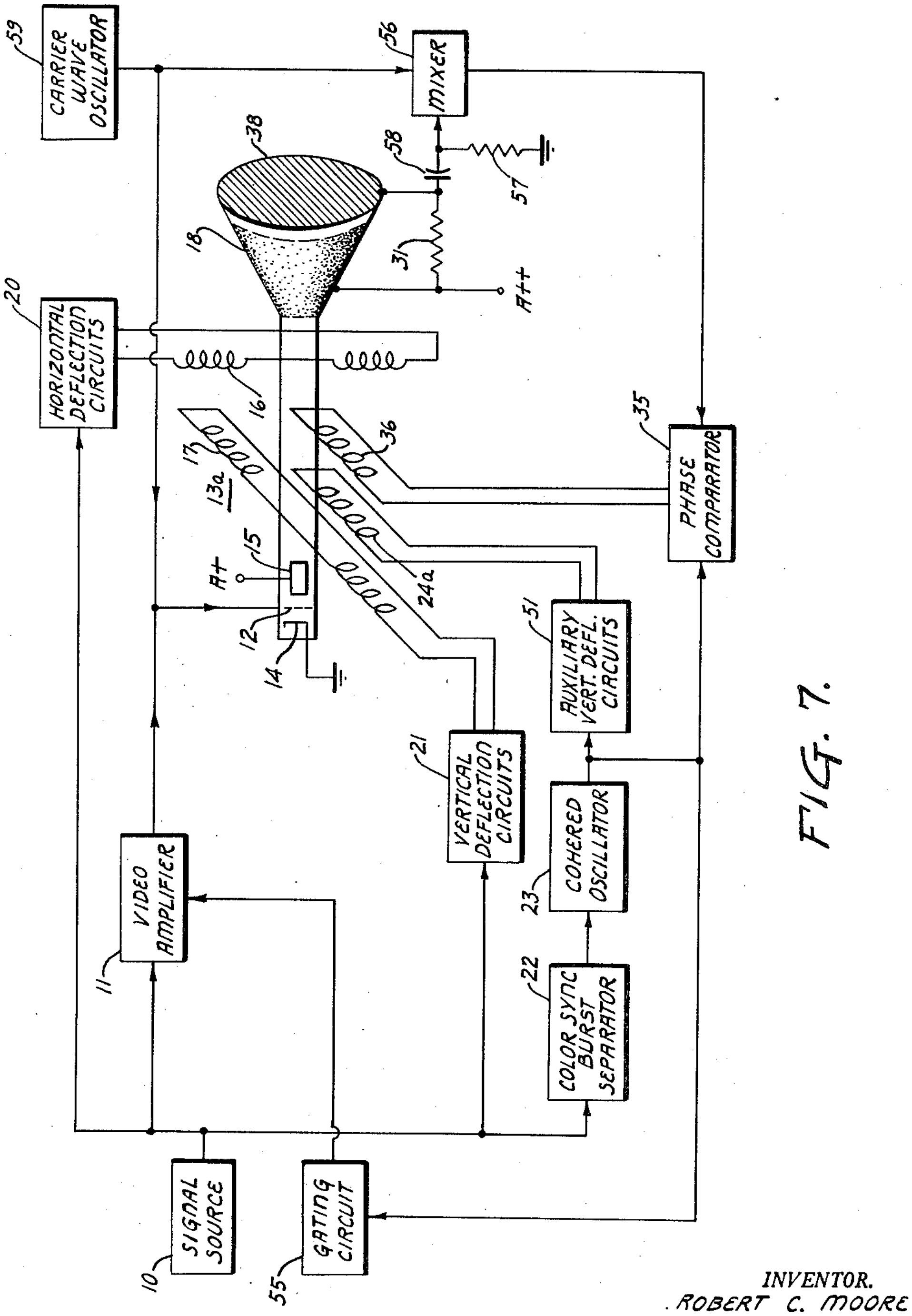
Figure 7 is illustrative of an embodiment of my invention in a color television receiver which has certain additional advantages over the embodiment of Figure 4.

In the system of Figure 7, to which more particular reference may now be had, means are provided for distinguishing between the desired indexing signal, which is produced as the beam traverses successive indexing and non-indexing portions of the screen, and undesired signals which are produced because the beam is intensity-modulated in accordance with color intelligence. In most respects the system illustrated in Figure 7 is identical to that illustrated in Figure 4 and similar components thereof have therefore been identified by the same reference numerals. Thus the system of Figure 7 includes a signal source 10, a video amplifier 11, a cathode ray tube **13*a*, horizontal, vertical and auxiliary deflection circuits 20, 21 and 51, a color burst separator 22, a cohered oscillator 23 and a phase comparator 35. All of the foregoing elements are exactly like those which are similarly designated in Figure 4 and are also interconnected in the same manner. In addition, the cathode ray tube 13*a* of Figure 7 includes the same individual components as the cathode ray tube 13*a* of Figure 4. These comprise cathode 14, beam intensity control grid electrode 12, first anode 15, second anode 18, and deflection coils 16, 17, 24*a* and 36. The screen structure 38 of cathode ray tube 13*a* of Figure 7 may also be identical to that illustrated in Figures 4 and 5 and is also provided with a screen output resistor 31**.

However, whereas in the system of Figure 4 the indexing signal produced at the output of filter 32, 33 was supplied directly to the phase comparator 35 where it served to develop, under certain circumstances, a correction deflection signal for application to correction coil 36, the corresponding indexing output signal is now supplied to one input circuit of a conventional mixer 56 by way of R-C network 57, 58. To the second input circuit of the mixer 56 there is supplied an additional signal from a carrier wave oscillator 59. This carrier wave oscillator 59 may be of any conventional form, such as a Hartley or a Colpitts oscillator, for example, provided only that it be constructed to operate at a frequency which is substantially in excess of the highest frequency components of the video signal. In the case under consideration, where the video signal is limited to a range below 4 megacycles, the carrier wave oscillator may appropriately be set to operate at 38.5 megacycles. In any event, no severe restrictions are imposed on the frequency stability of this oscillator because the performance of the system, as will be shown hereinafter, is not critically dependent upon this frequency.

The output signal of this oscillator is supplied not only to the mixer 56 but also to the beam intensity control grid electrode 12 of the cathode ray tube **13*a*. Accordingly the intensity of the electron beam produced by this cathode ray tube is modulated not only at the comparatively low video rate but also at the much higher rate of the carrier wave oscillation. The variations in beam intensity due to the carrier wave occur so rapidly that corresponding fluctuations in the intensity of the light emitted by the phosphor stripes occur much too rapidly to be perceived by the human eye. Consequently such intensity fluctuations will not be objectionable to an observer of the image formed on the screen. However, variations in secondary electron emissive will now also occur, not only at the video rate, but also at the much higher carrier wave oscillation rate. The amplitude of the secondary electron emission variations which occur at this latter rate will further be modulated by reason of the traversal by the beam of alternate indexing and non-indexing portions of the screen. Consequently there will be produced, across the screen output resistor 31 of the cathode ray tube, a signal of 38.5 megacycles nominal frequency which is amplitude-modulated at the aforementioned rate of transversal of indexing stripes. On the other hand, variations which appear in this output resistor, owing to beam intensity modulation by the video signal, will fall within or close to the comparatively low viedo frequency range, and the R–C network 57, 58 can be readily proportioned, pursuant to conventional principles of filter construction, to reject all the latter signal components while transmitting to the mixer signal components of carrier wave frequency and modulation components thereof. When the signal which is thus transmitted by R–C network 57, 58 is heterodyned with the unmodulated carrier wave signal in mixer 56, the modulation component is recovered and a signal is produced whose frequency is equal to the rate of transversal of successive indexing and non-indexing stripes, while its amplitude is dependent upon the extent to which the beam encroaches on the region occupied by an indexing stripe during each such traversal. This modulation component, which is indicative of beam location but which is free from variations due to video representative beam intensity variations, is then supplied to phase comparator 35** in place of a signal derived directly from the screen.

It is apparent that an arrangement similar to that of Figure 1 may also be modified in accordance with the teachings of Figure 7 if it is found that there is undesirable interference between screen output variations due to indexing stripe traversals and screen output variations due to video modulation. In particular, it is readily apparent that a carrier wave signal similar to that produced by oscillator 57 of Figure 7 can be added to the video signal at the beam intensity control grid electrode 12 of Figure 1. Secondary electron emission variations of the nominal frequency of the carrier wave signal are then derived from the screen output circuit and are heterodyned with the unmodulated carrier wave signal, the difference frequency heterodyne components resulting from this heterodyning operation being then supplied to the phase comparator 35.

Let it also be understood that the particular indexing arrangement hereinbefore described does not form an essential part of my invention. Numerous other arrangements are known for producing indications of electron beam impingement upon certain portions of a screen structure and any one of these may be used in a system embodying the invention. For example, it is possible to form certain of the color stripes themselves of a material having a different secondary electron emissivity than the remainder of the stripes. In that case, the separate indexing stripes shown in Figure 2 may be dispensed with. Furthermore, reliance on secondary electron emission phenomena may be avoided altogether, if desired, as it is perfectly feasible to derive suitable indexing signals from a photoelectric cell which views the screen structure through a filter transmissive of light of only one primary color emitted by the stripes.

Alternatively, reliance on secondary electron emission can be avoided by forming the separate indexing stripes, which are deposited on the interior surface of the aluminum film, of a fluorescent material and placing a photocell in a position where it will be impinged by light from these indexing stripes while remaining shielded from light emitted by the colored phosphors in the course of image formation. In such an arrangement, the aluminum film itself can be conveniently used to prevent the light emitted by the image phosphors from contaminating the light emitted by the indexing stripes and vice versa.

It will be understood that numerous modifications, other than those hereinbefore suggested, will occur to those skilled in the art without departing from my inventive concept. I therefore desire the scope of the latter to be limited only by the appended claims.

I claim:

1. In a cathode ray tube display system: means for producing a signal comprising successive portions representative of different intelligence components occurring in a predetermined order, signal portions representative of a particular component recurring at a predetermined rate; a cathode ray tube for producing visible indications of the intelligence represented by said signal, said tube comprising a screen structure, means for projecting an electron beam toward said screen structure and means supplied with said signal and responsive thereto to control the intensity of said beam, said screen structure comprising a plurality of parallel phosphor strips and a plurality of indexing strips, each pair of said indexing strips being associated with one of said phosphor strips and being disposed substantially parallel thereto, the different members of each pair of indexing strips being disposed near opposite edges of the associated phosphor strip and different pairs of said indexing strips being associated with different phosphor strips; means for deflecting said beam across said screen in first and second different directions and at rates such as to trace a plurality of substantially parallel paths upon said screen, successive ones of said parallel paths normally following different ones of said phosphor strips, said rate of beam deflection in said first direction being subject to fortuitous variations which cause the beam to deviate in said first direction from its normal path along said phosphor strips; means for producing cyclical deflections of said beam across said screen in said first direction at a rate substantially equal to said rate of recurrence of portions of said signal representative of a particular intelligence component and with an amplitude sufficient to cause said beam to traverse the width of a phosphor strip during each cycle of said deflection; means for deriving a signal in response to impingement of said beam on said indexing strips; and means for utilizing said derived signal to control the rate of beam deflection in said first direction so as to maintain each of said parallel paths substantially centered within one of said phosphor strips.

2. In a cathode ray tube display system: means for producing a signal comprising successive portions representative of different intelligence components occurring in a predetermined order and recurring at a predetermined rate; a cathode ray tube for producing visible indications of the intelligence represented by said signal, said tube comprising a screen, means for projecting an electron beam toward said screen and means supplied with said signal and responsive thereto to control the intensity of said beam, said screen comprising a plurality of spaced parallel phosphor strips and a plurality of indexing strips, each of said indexing strips being disposed in the space between a pair of adjacent phosphor strips and different indexing strips being disposed between different pairs of adjacent phosphor strips; means for deflecting said beam across said screen in first and second different directions and at rates such as to trace a plurality of substantially parallel paths upon said screen, successive ones of said parallel paths normally following different ones of said phosphor strips, said rate of beam deflection in said first direction being subject to fortuitous variations which cause the beam to deviate in said first direction from its normal path along said phosphor strips; means for producing cyclical deflections of said beam across said screen in said first direction at a rate substantially equal to said rate of recurrence of particular portions of said signal and for producing said cyclical deflections with an amplitude sufficient to cause said beam to traverse the width of a phosphor strip during each cycle of said deflection; means for deriving a signal in response to impingement of said beam on said indexing strips; and means for utilizing said derived signal to control the rate of beam deflection in said first direction.

3. In a cathode ray tube display system: means for producing a signal comprising successive portions representative of different intelligence components occurring in a predetermined order and recurring at a predetermined rate, a cathode ray tube for producing visible indications of the intelligence represented by said signal, said tube comprising a screen, means for projecting an electron beam toward said screen and means supplied with said signal and responsive thereto to control the intensity of said beam, said screen including a plurality of parallel phosphor strips and a plurality of pairs of indexing strips, each of said pairs of indexing strips being disposed near opposite edges of one of said phosphor strips and different pairs being disposed near different phosphor strips; means for deflecting said beam across said screen in first and second different directions and at rates such as to trace a plurality of substantially parallel paths upon said screen, successive ones of said parallel paths being substantially coincident with the center portions of different ones of said phosphor strips, said rate of beam deflection in said first direction being subject to fortuitous variations which cause the beam to deviate in said first direction from its normal path along said phosphor strips; means for producing cyclical deflections of said beam across said screen in said first direction at a rate substantially equal to said rate of recurrence of particular intelligence representative portions of said signal and with an amplitude sufficient to cause said beam to traverse the width of a phosphor strip during each cycle of said deflection and to cause said beam to impinge substantially equally upon indexing strips near opposite edges of said strip when following said normal path along said strip; means for deriving a signal in response to impingement of said beam on said indexing strips; and means for utilizing said derived signal to control the rate of beam deflection in said first direction.

4. The apparatus of claim 3 further characterized in that the said indexing strips disposed near the opposite edges of each said phosphor strip are substantially equidistant from the center portion of said strip and in that said means for producing cyclical deflection of said beam is operative to deflect said beam by substantially equal amounts first on one side and then on the other side of the path which said beam follows in the absence of said cyclical deflection.

5. In a cathode ray tube display system: means for producing a signal comprising successive portions representative of different color components of a polychromatic image occurring in a predetermined order, signal portions representative of a particular color component recurring at a predetermined rate; a cathode ray tube for producing visible indications of the color intelligence represented by said signal, said tube comprising a screen structure, means for projecting an electron beam toward said screen structure and means supplied with said signal and responsive thereto to control the intensity of said beam, said screen structure comprising a plurality of groups of parallel phosphor strips and a plurality of indexing strips, each of the phosphor strips in each of said groups being constituted of materials emissive of light of substantially the same color as one of said color components, and different ones of the phosphor strips in each of said groups being emissive of light of different ones of said colors and being disposed in said predetermined order, each pair of said indexing strips being disposed near and substantially parallel to one of said groups of phosphor strips, different ones of said pairs of indexing strips being disposed near different groups of phosphor strips, and the different members of each pair of indexing strips being disposed near opposite edges of the associated group of phosphor strips; means for deflecting said beam across said screen in first and second different directions and at rates such as to trace a plurality of substantially parallel paths upon said screen, successive ones of said parallel paths normally following different ones of said groups of phosphor strips, said rate of beam deflection in said first direction being subject to fortuitous variations which cause the beam to deviate in said first direction from its normal path along said phosphor strips; means for producing cyclical deflections of said beam across said screen in said first direction at a rate substantially equal to said rate of recurrence of portions of said signal representative of a particular intelligence component and with an amplitude sufficient to cause said beam to traverse the width of a group of said phosphor strips during each cycle of said deflection, thereby causing said beam to traverse the different phosphor strips of said group in the said order of occurrence of different intelligence components in said signal when traversing said group in one direction and to traverse said different phosphor strips in the reverse order when traversing said group of phosphor strips in the opposite direction; means for blanking said beam during traversal of phosphor strips in said reverse order; means for deriving a signal in response to impingment of said beam on said indexing strips and means for utilizing said derived signal to control the rate of beam deflection of said beam in said first direction so as to maintain each of said parallel paths substantially centered within one of said groups of phosphor strips.

6. Apparatus according to claim 5 further characterized in that said means for deflecting said beam in first and second directions are operative to cause said beam to trace paths across said screen normally following the center portion of each of said groups of phosphor strips and in that said means for producing cyclical deflections of said beam is operative to produce said deflections in substantially sinusoidal form.

7. In a cathode ray tube display system: means for producing a signal comprising successive portions representative of different intelligence components occurring in a predetermined order, signal portions representative of a particular component recurring at a predetermined rate; a cathode ray tube for producing visible indications of the intelligence represented by said signal, said tube comprising a screen structure, means for projecting an electron beam toward said screen structure, said screen structure comprising a plurality of parallel phosphor strips and a plurality of indexing strips, each pair of said indexing strips being associated with one of said phosphor strips and being disposed substantially parallel thereto, and different ones of said pairs of indexing strips being associated with different phosphor strips, the different members of each pair of said indexing strips being disposed near opposite edges of the associated phosphor strip; means for deflecting said beam across said screen in first and second different directions and at rates such as to trace a plurality of substantially parallel paths upon said screen, successive ones of said parallel paths normally following different ones of said phosphor strips, said rate of beam deflection in said first direction being subject to fortuitous variations which cause the beam to deviate in said first direction from its normal path along said phosphor strips; means for utilizing said intelligence representative signal to modulate the intensity of said beam to produce variations therein at rates not substantially exceeding said predetermined rate; means for modulating the intensity of said beam to produce variations therein at a rate substantially exceeding said predetermined rate; means for producing cyclical deflections of said beam across said screen in said first direction at a rate substantially equal to said predetermined rate and of an amplitude sufficient to cause said beam to traverse the width of a phosphor strip during each cycle of said deflections; means for deriving in response to impingement of said beam on said indexing strips a signal representative solely of variations in said beam intensity occurring at rates substantially in excess of said predetermined rate; and means for utilizing said derived signal to control the rate of beam deflection in said first direction so as to maintain each of said parallel paths substantially centered within one of said phosphor strips.

References Cited in the file of this patent

UNITED STATES PATENTS

| | | |
|---|---|---|
| 2,634,325 | Bond | Apr. 7, 1953 |
| 2,644,855 | Bradley | July 7, 1953 |
| 2,648,722 | Bradley | Aug. 11, 1953 |
| 2,650,264 | Weimer | Aug. 25, 1953 |
| 2,671,129 | Moore | Mar. 2, 1954 |
| 2,677,723 | McCoy | May 4, 1954 |